(No Model.)

L. A. MILLER.
ROASTER.

No. 539,283. Patented May 14, 1895.

Witnesses
Geo. E. Fricke
James W. Berard

Inventor
L. A. Miller
By Lehmann Pattison & Nesbit
Attys

UNITED STATES PATENT OFFICE.

LEWIS A. MILLER, OF GENOA, FLORIDA.

ROASTER.

SPECIFICATION forming part of Letters Patent No. 539,283, dated May 14, 1895.

Application filed August 24, 1894. Serial No. 521,221. (No model.)

*To all whom it may concern:*

Be it known that I, LEWIS A. MILLER, of Genoa, in the county of Hamilton and State of Florida, have invented certain new and useful Improvements in Roasters; and I do hereby declare the following to be a full, clear, and exact description of the invention, such as will enable others skilled in the art to which it pertains to make and use it, reference being had to the accompanying drawings, which form part of this specification.

My invention relates to an improved roaster; and the object of the same is to provide the roasting receptacle with a motor for keeping it in motion, and a further object is to protect the spring of the motor from the heat to which it would ordinarily be subjected if placed within a stove.

The invention consists in the novel features of construction hereinafter fully described and claimed, and illustrated in the accompanying drawings, in which—

Figure 1:
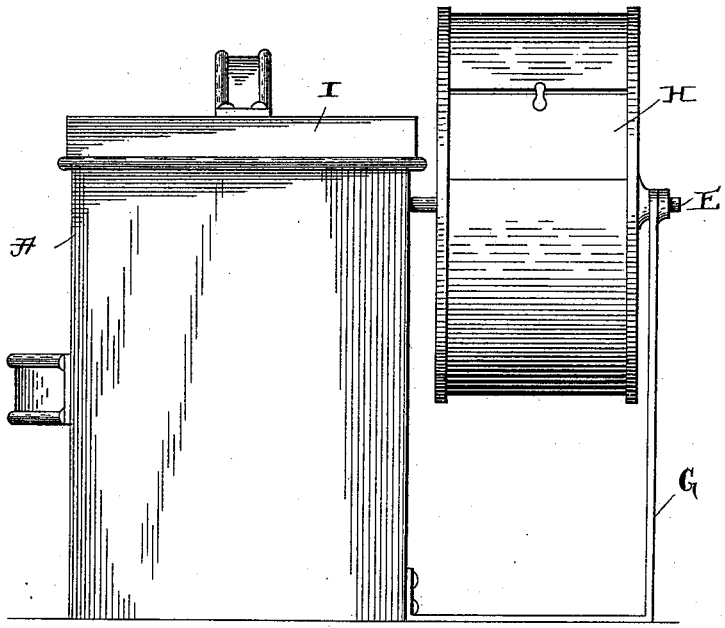
Figure 2:
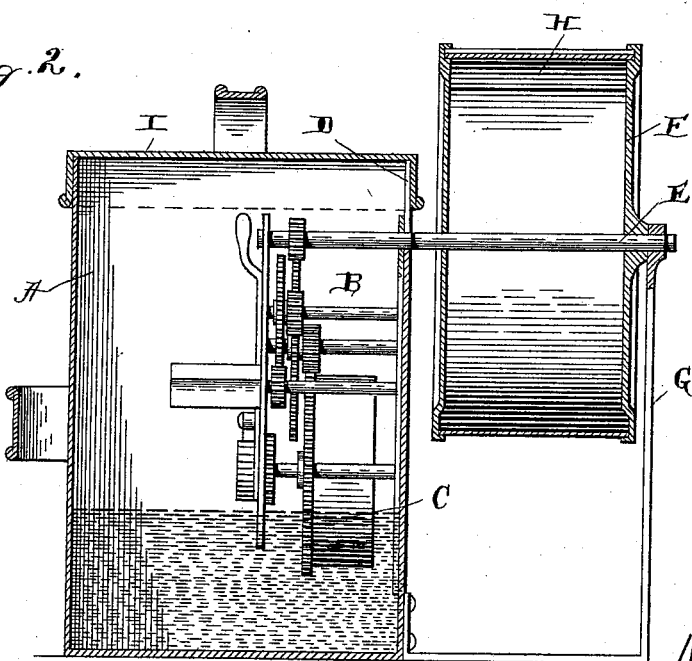

Figure 1 is a side elevation of the roaster. Fig. 2 is a vertical sectional view of the same.

A designates a reservoir of any suitable size and shape and secured to one of its inner sides is the spring motor mechanism B which is actuated by the main spring C of ordinary construction. The motor mechanism is elevated slightly from the bottom of the reservoir and the side of the latter is slotted at D through which the drive shaft E of the motor is extended and which forms the axis for the rotary roasting chamber F. The outer end of the axle is mounted in arm G which is extended upward as shown after being projected laterally from the bottom of the reservoir. The roasting chamber is provided with a suitable slide opening H for the insertion of the material, such as coffee to be roasted.

In operation the reservoir is partially filled with water and the cover I applied thereto and after the material to be roasted has been placed in the receptacle the device is positioned in the stove oven or upon a stove and the motor is set in operation. The roasting is thus effectually accomplished while the water in the reservoir prevents the main spring from being so affected by the heat as to lose its temper.

Having thus fully described my invention, what I claim as new, and desire to secure by Letters Patent, is—

1. In a roaster the combination of a roasting receptacle, a spring motor for actuating it, and a reservoir adapted to contain water which surrounds the initial spring of the motor, substantially as shown and described.

2. In a roaster the combination of a rotary roasting chamber, a reservoir, a spring motor mechanism within the reservoir and adapted to be protected by the water contained in the reservoir, an axle shaft projected outward through the side of the reservoir and upon which the roasting chamber is mounted, substantially as shown and described.

3. In a roaster the combination of a portable reservoir, a spring motor supported by and within said reservoir and having a shaft projected through the wall, the roaster carried by the shaft to one side of the reservoir, the reservoir containing water for surrounding and keeping cool the springs of the motor, substantially as shown and described.

In testimony whereof I affix my signature in presence of two witnesses.

LEWIS A. MILLER.

Witnesses:
N. SMITH, Jr.,
T. F. HARRISON.